United States Patent [19]

Siebert et al.

[11] Patent Number: 4,854,747
[45] Date of Patent: Aug. 8, 1989

[54] ECCENTRIC BEARING AND HANGER

[75] Inventors: Craig Siebert, Briarcliff Manor, N.Y.; Martin Scott, Brewster, Mass.

[73] Assignee: Metallized Carbon Corporation, Ossining, N.Y.

[21] Appl. No.: 121,475

[22] Filed: Nov. 17, 1987

[51] Int. Cl.[4] .................. F16C 19/50; F16C 35/06; F16C 43/04

[52] U.S. Cl. .................... 384/447; 384/434; 384/507; 384/515; 384/537

[58] Field of Search .............. 384/428, 432, 434–437, 384/513, 515, 543, 546, 537, 510, 539, 192, 447, 456, 477, 488, 489, 516, 542, 559–562, 584, 585, 507–511

[56] References Cited

U.S. PATENT DOCUMENTS

| | | | |
|---|---|---|---|
| 694,043 | 2/1902 | Wideman | 384/456 |
| 2,740,676 | 4/1956 | Potter | 384/537 |
| 2,868,594 | 1/1959 | Leister | 384/192 |
| 2,992,049 | 7/1961 | Siebert et al. | 384/442 |
| 4,560,290 | 12/1985 | Siebert | 384/434 |
| 4,652,151 | 3/1987 | Siebert | 384/434 |
| 4,699,527 | 10/1987 | Hutzel | 384/513 X |

FOREIGN PATENT DOCUMENTS

| | | | |
|---|---|---|---|
| 0113210 | 2/1918 | United Kingdom | 384/507 |
| 0197861 | 5/1923 | United Kingdom | 384/508 |

Primary Examiner—Thomas R. Hannon
Attorney, Agent, or Firm—Jordan B. Bierman

[57] ABSTRACT

A ball bearing comprising a substantially circular inner race having a first center, a substantially circular outer race having a second center substantially surrounding the inner race. The outer race is made up of a base and a pair of radially inwardly extending flanges which are spaced apart axially from one another. The flanges extend further inwardly at or adjacent the top of the bearing than they do from the bottom of the bearing. Rollable balls are held by the races in the usual manner. The provision of the extended upper flange permits greater wear of the balls before the bearing fails. This increases the times between the need for bearing changes.

9 Claims, 4 Drawing Sheets

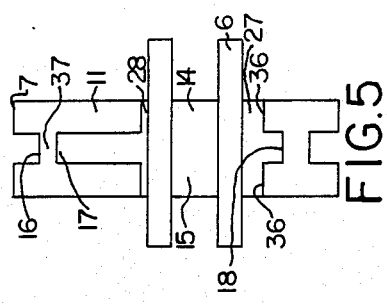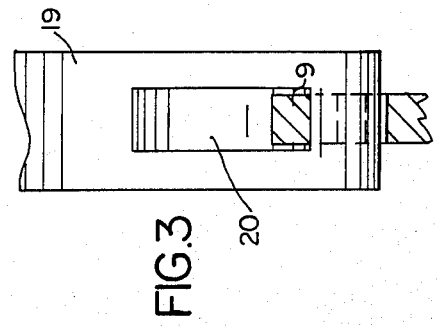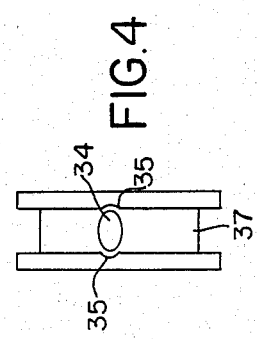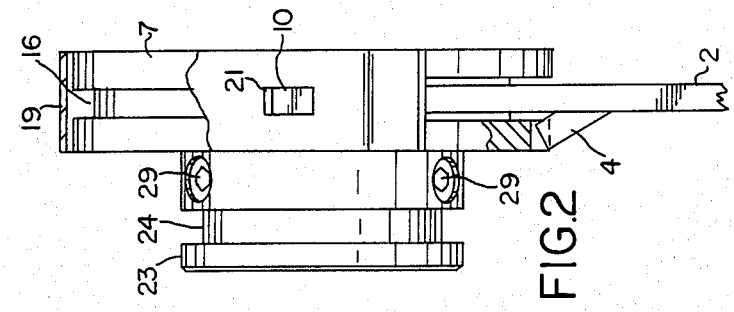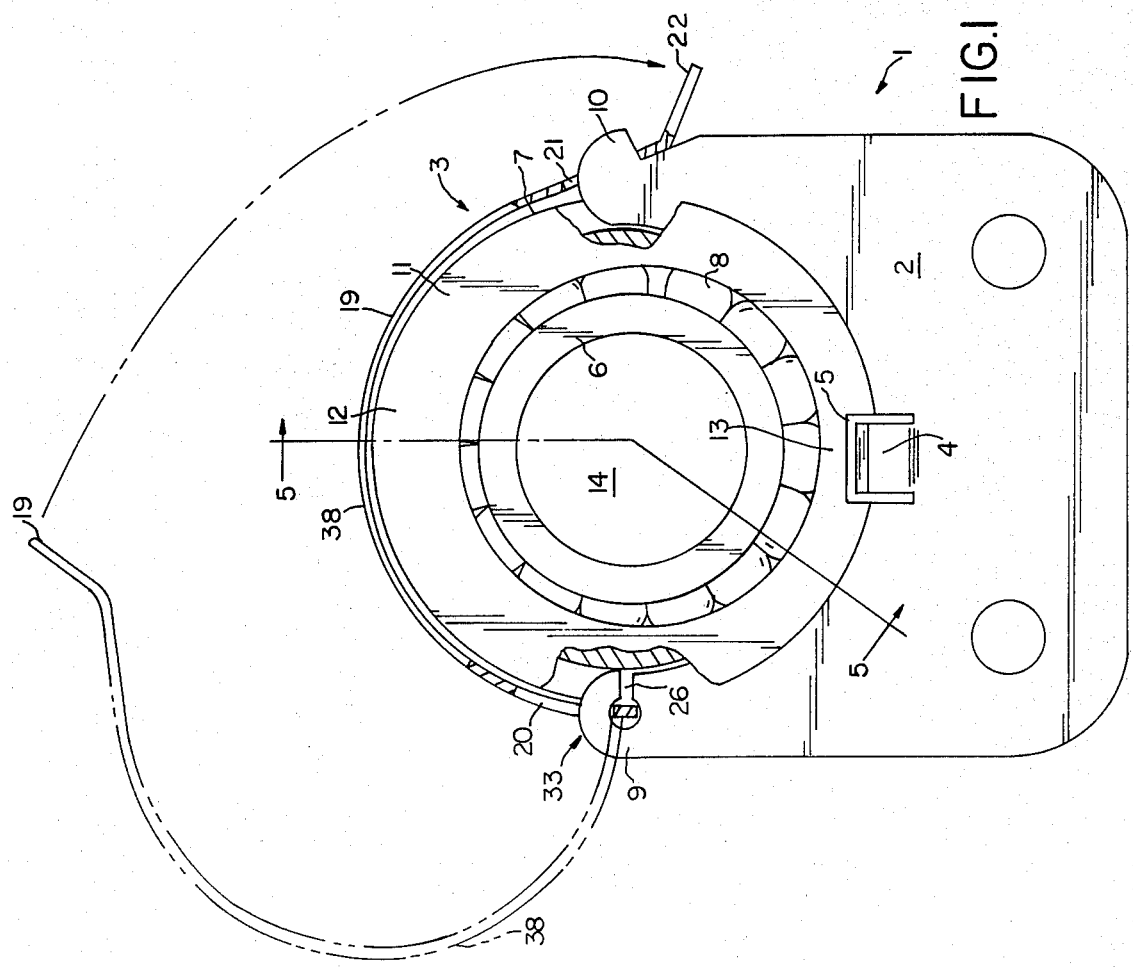

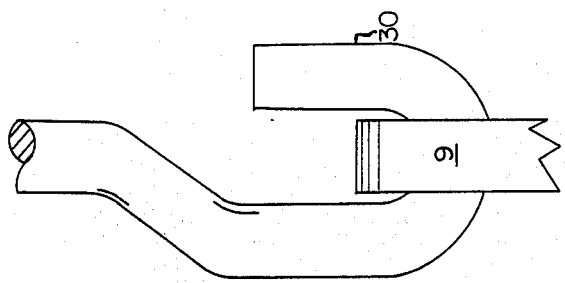
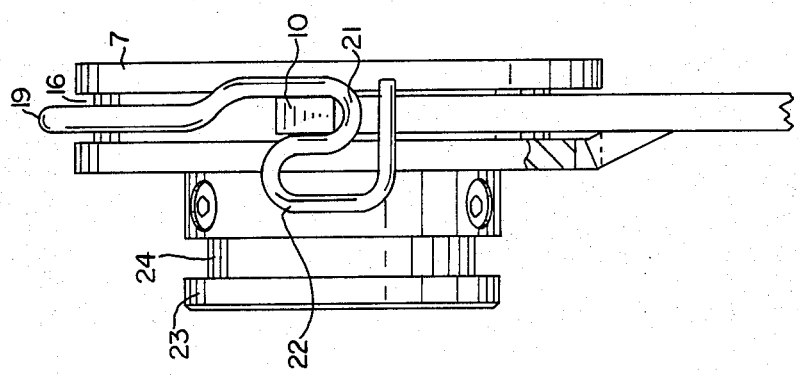
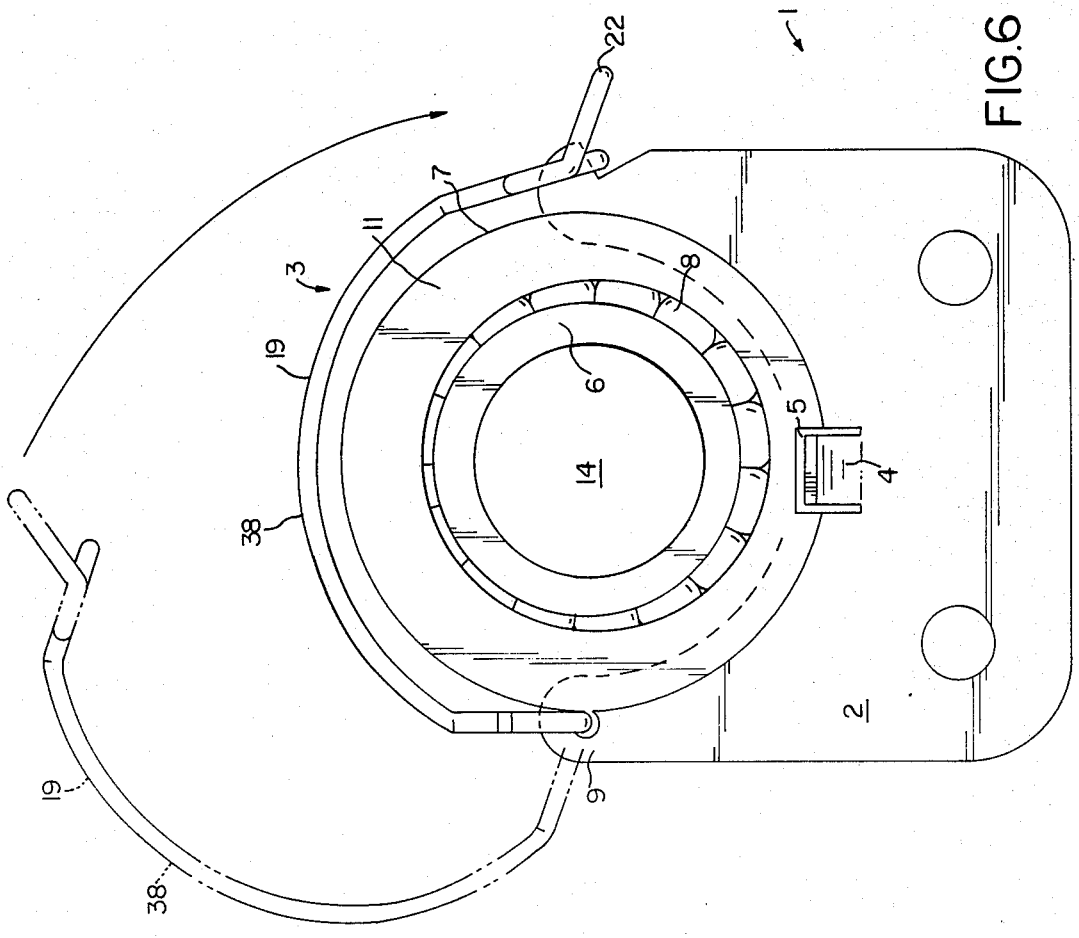

ECCENTRIC BEARING AND HANGER

The present invention is directed to an improved ball bearing, particularly one designed for use at elevated temperatures.

Ovens for treatment of gypsum board have been known for many years. Manufacturers are anxious to increase the throughput of product and, in order to accomplish this, it has been deemed necessary to increase the temperature of the kilns to more than 1,000° F., a temperature which even graphite is unable to withstand. Therefore, it is necessary that the bearings supporting the rollers operate without lubricants. Thus, only dry ball bearings will suffice. However, this creates a serious wear problem, since the balls rub against one another and are abraded at a relatively rapid rate. Kilns of this type must have their bearings changed every three or four months.

Such a change is a major undertaking and is extremely expensive. The entire plant must be shut down because there are no facilities for storing wet gypsum board. The kilns are allowed to cool for several hours and a large crew of approximately 15 men work on the device in order to replace the bearings. Asbestos gloves are used in order to allow the men to begin work before the kiln has completely cooled. Furthermore, in order to speed up the process, only those bearings in which at least some of the balls have dropped out are changed. Even under such circumstances, it takes at least one day to complete the operation.

It will be appreciated that the shaft which is supported by the bearings is pulled downwardly by gravity. Therefore, if the balls have worn, for example, 0.030 inches, the gap at the top of the bearing is equal to this amount plus the 0.030 inches wear on the balls themselves. This is because the shaft moves downward as the balls become smaller and all of the clearance is concentrated at the top of the bearing. In other words, the gap at the top is twice the wear on the balls. As a result, the balls tend to fall out the top, resulting in failure of the bearing and dropping down of the roller This sometimes causes the board to jam against the following roller and breaking up. It also may stop the roller from turning which can cause the drive chain or sprocket to break, thus necessitating the complete shutdown of the kiln for repairs.

It is also the purpose of this invention to provide a bearing which does not require the often difficult and time consuming removal of rusty bolts to replace worn out bearings. This also eliminates the need to realign the roller and shaft when installing new bearings as is now required with the ensuing one piece bearing hanger assembly.

It is further among the objects of this invention to provide a bearing which can be quickly removed from its hanger (which remains bolted) by the simple hand release of a spring type retainer, coupled with the use of a pulling tool to remove the bearing from the shaft, if necessary.

It is still further among the objects of this invention to provide a ball bearing, which has limited movement in the hanger to allow proper alignment with the shaft, a feature not available with bearings now in use. Improper alignment of the bearing and the shaft is also a cause of bearing failure.

The ball bearing of the present invention solves the foregoing problem. It comprises a substantially circular inner race and a substantially circular outer race surrounding the inner race. At least one of said inner race and said outer race comprising a base and a pair of axially spaced apart flanges extending radially toward the other of said inner race and said outer race. It is an important feature of the Invention that the gap (which is between the pair of flanges on one race and base of the other race or is between the pair of flanges on one race and the pair of flanges on the other race) be narrower at or adjacent the top of the bearing than at the bottom of the bearing. The rollable balls are held between the flanges and bear on both the outer race and the inner race. Thus, when the balls wear, there is more flange to hold them in at the top of the bearing and, hence, premature release of the balls is avoided.

In a preferred embodiment of the invention, the inner race extends a substantial axial distance and forms a projection on at least one side of the bearing. A circumferential grip is cut into the projecting portion and provides a purchase for a removal tool. This speeds up the replacement process.

In a further preferred embodiment of the present invention, the bearing also includes a hanger having a rim adapted to receive the outer race. The rim generally conforms to the shape of the outer race and terminates in a hook at one end and a tab at the other end. The hook has a slot therein which constitutes an entry. A clip, having a slot adjacent one end thereof, is adapted to enter the hook through the entry and, at the same time, receive the hook within the slot, thereby forming a hinge. Adjacent the other end of the clip is a retainer which is adapted to releasably engage the tab. The clip has an arcuate portion located between the slot and the retainer; this portion bears against the outside of the top of the bearing, thereby retaining it in position. It is most preferable that a peripheral groove be provided in the outer race of the bearing, into which the rim of the hanger fits.

To prevent unwanted rotation of the outer race, a recess is provided in either the bearing or the hanger rim and a corresponding key in the other of these two elements. This provides a lock which will not permit the outer race to turn.

In another embodiment of the present invention, the clip is in the form of a heavy wire bent into a particular shape. At one end of the wire there is a hook which engages the hook on the rim, thereby forming a hinge which permits rotation of the clip. In this embodiment, it is not necessary that the hook on the rim have an entry if one is present on the clip, and vice-versa. Adjacent the other end of the clip is a retainer which releasably engages the tab and, as in the previous embodiment, there is an arcuate portion of the clp between the hook and the retainer which bears against the outside of the top of the bearing. In this case, the retainer comprises an open loop of the wire clip.

In still another embodiment of the present invention, the bearing is attached to the hanger by means of a spring clip and lug combination. A plurality of lugs are mounted on one face of the hanger and each is preferably of generally L-shaped cross-section, having a recess therein. The spring clip is compressed and, when released, enters the recesses. At least some of the parts of the clip intermediate those portions which have entered the recesses bear against the bearing, thereby securing it to the hanger. In a particularly advantageous form of this embodiment, there are four such lugs disposed symmetrically around the periphery of the bearing and the clip forms substantially three sides of a rectangle. The legs are pressed together in order to insert portions into the recesses.

In order to insert the balls into the bearing, a hole is provided through the base of the outer race. The hole is large enough to permit the balls to pass therethrough. When the balls have all been inserted, a suitable plug is placed in the hole in order to prevent the balls from falling out.

In the accompanying drawings, constituting a part hereof and in which like reference characters indicate like parts, FIG. 1 is a front view of one embodiment of the present invention, partly in section and with some parts partially broken away for clarity;

FIG. 2 is a right side view of the device of FIG. 1, partly broken away and party in section;

FIG. 3 is an enlarged fragmentary view of the hinge of the device of FIG. 1, partly in section;

FIG. 4 is a top view of the device as shown in FIG. 1 with parts omitted for clarity;

FIG. 5 is a sectional view along line 5—5 of FIG. 1;

FIG. 6 is a view similar to that of FIG. 1 of another embodiment of the present invention;

FIG. 7 is a view similar to that of FIG. 2 of the embodiment of FIG. 6;

FIG. 8 is an enlarged fragmentary view of the hinge of the device of FIG. 6;

Figure 9:
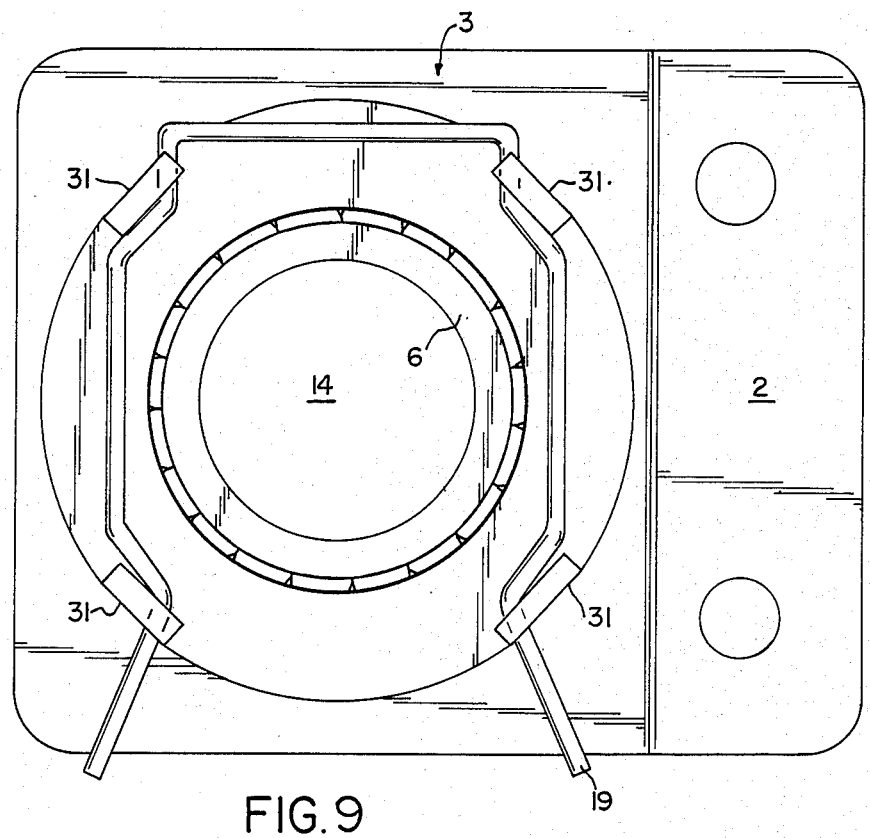
FIG. 9 is a view similar to that of FIG. 1 of still further embodiment of the present invention.

Referring more specifically to FIGS. 1 to 5, bearing assembly 1 comprises hanger 2 and bearing 3. Hanger 2 has key 4 which fits into recess 5 of bearing 3.

Bearing 3 comprises inner race 6 and outer race 7, the latter having flanges 11 around its periphery. Between flanges 11 is base 37 which, together with flanges 11, forms upper trough 17. Balls 8 are located between flanges 11 and bear on both outer race 7 and inner race 6. Hole 14 is provided in inner race 6 to receive a shaft (not shown).

Hanger 2 is provided with a rim which corresponds to the outer dimension of bottom 13 of bearing 3. The rim terminates in hook 9 having entry 26 and, at the other end thereof, tab 10. Clip 19 carries slot 20 adjacent one end thereof. The end is inserted through entry 26 into hook 9 and hook 9 passes through slot 20, as shown in FIG. 3. At the other end of clip 19 is retainer 21 which releasably engages tab 10 to secure bearing 3 in position. Clip 19 has arcuate portion 38 which, in this embodiment, closely approximates the curvature of bearing 3. Clip 19 is shown in full lines in its closed position and in phantom lines in its open position in FIG. 1.

It is a feature of the present invention that flanges 11 are longer at or adjacent to top 12 than they are at or adjacent to bottom 13. Thus, upper trough 17 is substantially deeper than lower trough 18. Flanges 11 terminate in edges 36.

In another way of describing the present invention, the circle defined by edges 36 has a center which is below the center of the circle defined by the inner or outer walls of inner race 6. Thus, bottom space 27 is greater than top space 28.

The flanges may be on either the inner race, the outer race, or both, but the concentric edges (e.g. edges 36) are on the non-rotating flanges or race.

As can best be seen in FIG. 4, balls 8 are fed into the bearing through an opening in base 37 of outer race 7. When the race is full, plug 34 is inserted into the opening to prevent the escape of the balls. If necessary, clearances 35 are cut in outer race 7 to permit plug 34 to be inserted.

As a further feature of the present invention, inner race 6 is provided with projection 23 having grip 24 cut therein. This is to permit a removing tool to obtain a solid purchase on inner race 6. Thus, when end 22 of clip 19 is moved upward, it releases retainer 21 from tab 10 and clip 19 assumes the position shown in phantom in FIG. 1. However, it is frequently the case that bearing 3 is rusted to the shaft and is not easily removed. Grip 24 provides a desirable purchase for the removal tool to break inner race 6 and bearing 3 loose from the shaft.

The bearing shown in FIGS. 6 to 8 is similar to that previously described. The principal difference resides in the shape and form of clip 19. In this embodiment, clip 19 is formed of a single wire bent into the required shape. Hook 9 does not require an entry and clip 19 is provided with member 30 which engages hook 9. Arcuate portion 38 preferably rests within groove 16 in order to retain bearing 3 in place. Tab 10 is engaged by retainer 21 which, in this embodiment, comprises a bent open loop of wire.

Figure 10:
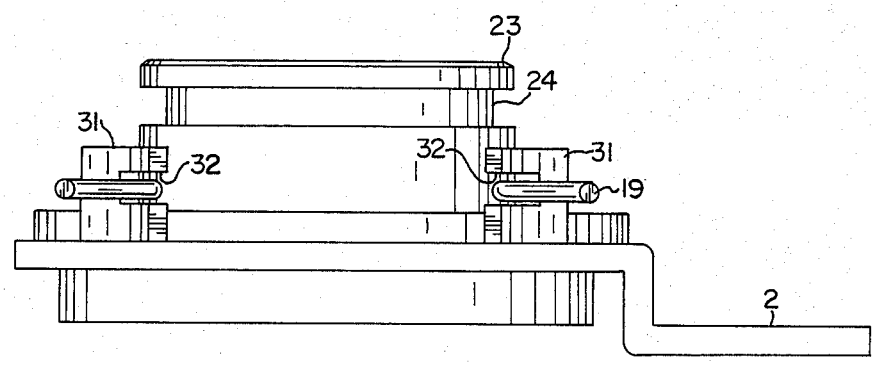
FIG. 10 is a right side view of the device of FIG. 9.

A still further embodiment of the present invention is shown in FIGS. 9 and 10. Hanger 2 is provided with lugs 31 of preferably L-shaped cross-section as can best be seen in FIG. 10. Lugs 31 have recesses 32 adapted to receive portions of clip 19. To secure bearing 3 to hanger 2, the ends of clip 19 are pressed together, bearing 3 is located in its proper position on hanger 2, and clip 19 is inserted into recesses 32 of lugs 31 and allowed to spring outwardly, thus assuming the position shown in FIG. 9. As can be seen from this FIG., the parts of clip 19 between the portions in recesses 32 bear against bearing 3 and serve to hold it in place.

Figure 12:
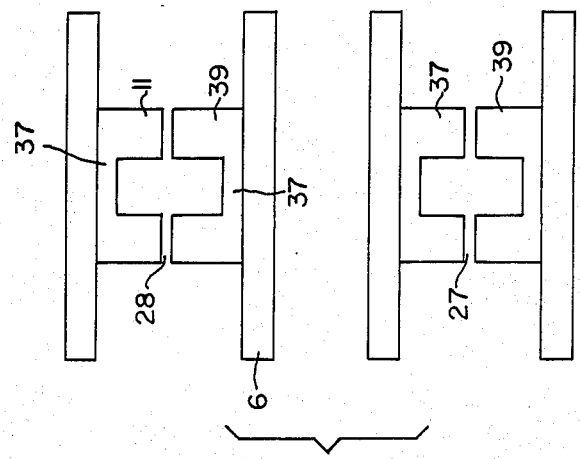
FIG. 12 is a view similar to that of FIG. 11 showing an embodiment wherein the flanges extend from both the inner and outer races.
Figure 11:
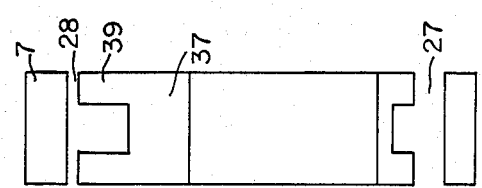
FIG. 11 is a view similar to that of FIG. 5 showing an embodiment wherein the flanges extend from the inner race only.

Referring to FIG. 11, inner flanges 39 extend radially outwardly from base 37 toward outer race 7. In FIG. 12, inner flanges 39 and outer flanges 11 extend radially toward each other. In each case, top space 28 is narrower than bottom space 27.

As will be readily understood by those having ordinary skill in the art, the problem which this invention is intended to solve results from the tendency of the rollers, as the balls are worn, to move downwardly, thereby concentrating all of the gap formed at or near the top of the bearing. Of course, if the inner race is urged in some other direction (for any reason), then the gap will concentrate at the point on the bearing away from which the inner race is urged. For example, if there is some form of spring loading, it may tend to force it upwardly, rather than downwardly. Therefore, it is understood that, in the claims which follow, terms such as down, bottom, downwardly, etc. are all intended to indicate a direction toward which the inner race is urged with relation to the outer race. Similarly, terms such as top, up, upwardly, etc. are intended to indicate a direction opposite to that in which the inner race is urged with respect to the outer race.

While only a limited number of specific embodiments of the present invention have been expressly disclosed, it is nonetheless to be broadly construed, and not to be limited except by the character of the claims appended hereto.

What is claimed is:

1. A ball bearing having a top and a bottom comprising a substantially circular inner race, a substantially circular outer race substantially surrounding said inner race, a first pair of axially spaced apart flanges extending radially outwardly from said inner race and/or a second pair of axially spaced apart flanges extending radially inwardly from said outer race, there being a gap between said first pair and said outer race, said second pair and said inner race, or said first pair and said second pair, said gap being narrower at or adjacent the top of said bearing than at or adjacent the bottom of said bearing substantially constantly during rotation of said bearing, rollable balls at least partially between said first pair, said second pair, or both, said balls bearing on said inner race and said outer race, said inner race having a first center, said outer race having a second center, a non-rotating one of said first pair and said second pair of flanges terminating in edges which define a substantial circle having a third center, said first and second centers being coincident, and said third center being above said first and second centers when said edges are on said first pair of flanges and below said first and second centers when said edges are on said second pair of flanges.

2. The bearing of claim 1 wherein said inner race extends a substantial axial distance to form a projection on at least one side of said bearing, said projection having a circumferential grip adjacent the extremity of said projection, whereby purchase for a removal tool is provided.

3. The bearing of claim 1 further comprising a hanger having a rim adapted to receive said outer race, said rim terminating in a hook at one end and a tab at the other end, said hook having an entry thereon, a clip having a slot adjacent one end thereof and adapted to enter said hook through said entry and receive said hook in said slot, thereby forming a hinge, a retainer adjacent the other end of said clip adapted to releasably engage said tab, an arcuate portion of said clip located between said slot and said retainer, at least part of said arcuate portion bearing against the outside of the top of said bearing.

4. The bearing of claim 3 wherein a peripheral groove is provided in said bearing, said groove adapted to receive said rim of said hanger.

5. The bearing of claim 3 wherein a recess is provided at or adjacent the bottom of said bearing on one of said bearing and said hanger, there being a key at or adjacent said rim on the other of said bearing and said hanger, said key bearing against said recess thereby reducing the tendency of said outer race to rotate.

6. The bearing of claim 1 further comprising a hanger having a rim adapted to receive said outer race, said rim terminating in a first hook at one end and a tab at the other end, a clip having a second hook adjacent one end thereof adapted to enter said first hook, thereby forming a hinge, a retainer adjacent the other end of said clip adapted to releasably engage said tab, an arcuate portion of said clip located between said second hook and said retainer, at least part of said arcuate portion bearing against the outside of the top of said bearing, said retainer comprising an open loop of said clip.

7. The bearing of claim 1 further comprising a hanger having a rim adapted to receive said outer race, said hanger having a plurality of lugs mounted on a face thereof, each of said lugs having a recess therein, a clip adapted to bear against said bearing and having portions adapted to enter at least some of said recesses, thereby securing said bearing to said hanger.

8. The bearing of claim 7 wherein there are four said lugs, said clip forms substantially three sides of a rectangle, there being four of said portions in said recesses, and parts of said clip intermediate said portions bear against said bearing.

9. The bearing of claim 1 wherein there is an opening extending through said base of said outer race which is of sufficient size to permit said balls to pass therethrough, whereby said balls are inserted into said outer race, and a plug in said opening preventing said balls from exiting said outer race.

* * * * *